US009156517B2

(12) United States Patent
Kaita et al.

(10) Patent No.: US 9,156,517 B2
(45) Date of Patent: Oct. 13, 2015

(54) REAR STRUCTURE AND REAR EQUIPMENT FOR STRADDLE TYPE VEHICLE

(71) Applicant: HONDA MOTOR CO., LTD., Tokyo (JP)

(72) Inventors: Kihoko Kaita, Wako (JP); Ryoichi Miura, Wako (JP); Hironobu Kai, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 14/226,418

(22) Filed: Mar. 26, 2014

(65) Prior Publication Data
US 2014/0291961 A1  Oct. 2, 2014

(30) Foreign Application Priority Data
Mar. 29, 2013  (JP) ................ 2013-071112

(51) Int. Cl.
| B62K 11/00 | (2006.01) |
| B62K 19/40 | (2006.01) |
| B62J 1/12 | (2006.01) |
| B62J 1/28 | (2006.01) |
| B62J 27/00 | (2006.01) |
| B62K 11/04 | (2006.01) |
| B62K 11/02 | (2006.01) |

(52) U.S. Cl.
CPC . *B62K 19/40* (2013.01); *B62J 1/12* (2013.01); *B62J 1/28* (2013.01); *B62J 27/00* (2013.01); *B62K 11/04* (2013.01); *B62K 11/00* (2013.01); *B62K 11/02* (2013.01)

(58) Field of Classification Search
CPC ........ B62K 11/00; B62K 11/02; B62K 11/04; B62K 2710/04
USPC .................................................. 280/202, 293
See application file for complete search history.

(56) References Cited

U.S. PATENT DOCUMENTS

| 6,073,948 | A  | * | 6/2000  | Motojima et al. | 280/152.2 |
| 2009/0001113 | A1 | * | 1/2009  | Butkiewicz et al. | 224/413 |
| 2009/0057046 | A1 | * | 3/2009  | Kofuji | 180/226 |
| 2011/0057486 | A1 | * | 3/2011  | Inoue et al. | 297/215.13 |
| 2013/0257115 | A1 | * | 10/2013 | Kishi et al. | 297/195.1 |
| 2014/0167386 | A1 | * | 6/2014  | Tako et al. | 280/288 |
| 2014/0167387 | A1 | * | 6/2014  | Komatsu et al. | 280/288 |

FOREIGN PATENT DOCUMENTS

JP    2002-284075 A    10/2002

* cited by examiner

*Primary Examiner* — Tony Winner
*Assistant Examiner* — Marlon Arce
(74) *Attorney, Agent, or Firm* — Birch, Stewart, Kolasch & Birch, LLP

(57) ABSTRACT

In a rear structure for a straddle type vehicle including a front seat, on which a rider sits, seat rails for supporting a rear seat, on which a pillion passenger sits behind the rider, grab rails, which are attached on a vehicle body on the sides of the rear seat, a backrest, detachably attached to the rear portion of the vehicle, and a space for the pillion passenger to hold the grab rail, which is formed between the grab rail and the vehicle body. The grab rail is configured such that a grip portion extends in the front-and-rear direction of the vehicle body, and the backrest is disposed inside the grip portion, is supported at the front and rear of the grip portion by the grab rail and overlaps the grip portion in a side view.

20 Claims, 8 Drawing Sheets

REAR STRUCTURE AND REAR EQUIPMENT FOR STRADDLE TYPE VEHICLE

CROSS-REFERENCE TO RELATED APPLICATIONS

The present application claims priority under 35 USC 119 to Japanese Patent Application No. 2013-071112 filed Mar. 29, 2013 the entire contents of which are hereby incorporated by reference.

BACKGROUND OF THE INVENTION

1. Field of the Invention

The present invention relates to a rear structure and rear equipment for a straddle type vehicle.

2. Description of Background Art

As a conventional rear structure for a straddle type vehicle, there has been known a structure wherein a rear carrier is attached to a support portion provided on a body frame and grab rails can be attached as a substitute for the rear carrier. See, for example, Japanese Laid-open Patent Publication No. 2002-284075.

However, in the conventional rear structure for the straddle type vehicle mentioned above, the rear equipment such as the rear carrier and the grab rails cannot be mounted at the same time. It is desirable to be able to mount the rear equipment and the grab rails at the same time.

SUMMARY AND OBJECTS OF THE INVENTION

It is an object of an embodiment of the present invention to make it easy to hold the grab rails while improving the support of the rear equipment on the vehicle body.

According to an embodiment of the present invention, it is easy to hold the grab rails while improving the support of the rear equipment on the vehicle body.

To achieve the above-mentioned object, according to an embodiment of the present invention, a rear structure for a straddle type vehicle includes a front seat (12a), on which a rider sits, seat rails (16) for supporting a rear seat (12b), on which a pillion passenger sits behind the rider, grab rails (40), which are attached on a vehicle body on the sides of the rear seat (12b), rear equipment (42), which is detachably attached to the rear portion of the vehicle, and a space (S) for the pillion passenger to hold the grab rail (40), which is formed between the grab rail (40) and the vehicle body. The grab rail (40) is configured such that a grip portion (53) extends in the front-and-rear direction of the vehicle body. The rear equipment (42) is disposed inside the grip portion (53) and is supported at the front and rear of the grip portion (53) by the grab rail (40) and overlaps the grip portion (53) in a side view.

According to an embodiment of the present invention, the rear equipment is disposed inside the grip portion and is supported at the front and rear of the grip portion by the grab rail and overlaps the grip portion in a side view. With such a construction, the interval of the front and rear fixing portions is lengthened by fixing the rear equipment on the front and rear of the grip portion, which can support the rear equipment effectively. In addition, since the rear equipment is unobstructively located inside the grip portion, the space can be secured between the grip portion and the vehicle body. Accordingly, it is easy for the pillion passenger to hold the grab rail.

According to an embodiment of the present invention, the grab rails (40) are fastened vertically relative to the vehicle body in the front and rear of the grip portions, and the rear equipment (42) is fastened to equipment mounting portions (57, 58), which are formed inside the grab rails (40), with bolts (67, 69) which are screwed in the left-and-right direction of the vehicle body.

According to an embodiment of the present invention, in a side view, the fastening portions of the grab rail, the equipment mounting portions and the bolts are difficult to be seen from outside, which can improve the external appearance.

According to an embodiment of the present invention, the grab rails (40) are provided in a left and right pair, and are disposed in a tapered shape in such a way that the interval of the left and right grab rails (40) becomes gradually narrower as it approaches the rear side, and the rear equipment (42) is a backrest which is formed by bending a piece of pipe.

According to an embodiment of the present invention, the rear equipment can be made vertically narrower, so that the rear equipment can be disposed so as to be accommodated within the width of the grab rails, which thereby improves the external appearance. Further, it is possible to improve the rigidity of the backrest.

According to an embodiment of the present invention, the rear equipment (42) has seating surfaces (70) which are formed by flattening the pipe, and plate-like brackets (71a) of a rear carrier (43) are fastened to the seating surfaces (70).

According to an embodiment of the present invention, the rear carrier can be fastened with a simple configuration.

According to an embodiment of the present invention, saddlebag stays (75) are fastened together with the equipment mounting portions (57, 58).

According to an embodiment of the present invention, the saddlebag stays can be provided with a simple configuration.

According to an embodiment of the present invention, the rear equipment (42) has front-and-rear extension portions (62) extending in the front-and-rear direction along the grab rails (40) with each of the front-and-rear extension portions (62) being fixed on the grab rail (40) so as to connect the front and rear of the grip portion (53) as well as to overlap the grip portion (53) in a side view.

According to an embodiment of the present invention, the rear equipment can be supported via the front-and-rear extension portions on the grab rails effectively. Thus, the rigidity of the grab rails is improved. Further, it is possible to improve the external appearance by hiding the entire front-and-rear extension portions inside the grab rails. 100191 According to an embodiment of the present invention, the rear equipment is detachably attached to the straddle type vehicle and includes the seat rails (16) for supporting the rear seat (12b), whereon the pillion passenger sits behind the rider, the grab rails (40), which are attached on the vehicle body on the sides of the rear seat (12b), and the space (S) for the pillion passenger to hold the grab rail (40), which is formed between the grab rail (40) and the vehicle body. The grab rail (40) is configured such that the grip portion (53) extends in the front-and-rear direction of the vehicle body. The rear equipment (42), disposed inside the grip portion (53), is supported at the front and rear of the grip portion (53) by the grab rail (40) and overlaps the grip portion (53) in a side view.

According to an embodiment of the present invention, the interval of the front and rear fixing portions is lengthened by fixing the rear equipment on the front and rear of the grip portion, which can support the rear equipment effectively. In addition, since the rear equipment is unobstructively located inside the grip portion, the space can be secured between the grip portion and the vehicle body. Accordingly, it is easy for the pillion passenger to hold the grab rail.

In the rear structure and the rear equipment for the straddle type vehicle according to an embodiment of the present invention, the interval of the front and rear fixing portions is lengthened by fixing the rear equipment on the front and rear of the grip portion, which can support the rear equipment effectively. In addition, since the rear equipment is unobstructively located inside the grip portion, the space can be secured between the grip portion and the vehicle body. Accordingly, it is easy for the pillion passenger to hold the grab rail.

In addition, in a side view, the fastening portions of the grab rail, the equipment mounting portions and the bolts are difficult to be seen from outside, which can improve the external appearance.

Further, the rear equipment can be disposed so as to be accommodated within the width of the grab rails. Thus, the external appearance is improved. Furthermore, it is possible to improve the rigidity of the backrest.

Moreover, the rear carrier can be fastened with a simple configuration.

In addition, the saddlebag stays can be provided in a simple configuration.

Further, the rear equipment can be supported via the front-and-rear extension portions on the grab rails effectively. In addition, it is possible to improve the rigidity of the grab rails as well as to improve the external appearance by hiding the entire front-and-rear extension portions inside the grab rails.

Furthermore, the interval of the front and rear fixing portions of the rear equipment is lengthened, which can support the rear equipment effectively. In addition, since the rear equipment is located so as not to be obstructive to the grip portion, the space can be secured between the grip portion and the vehicle body. Accordingly, it is easy for the pillion passenger to hold the grab rail.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
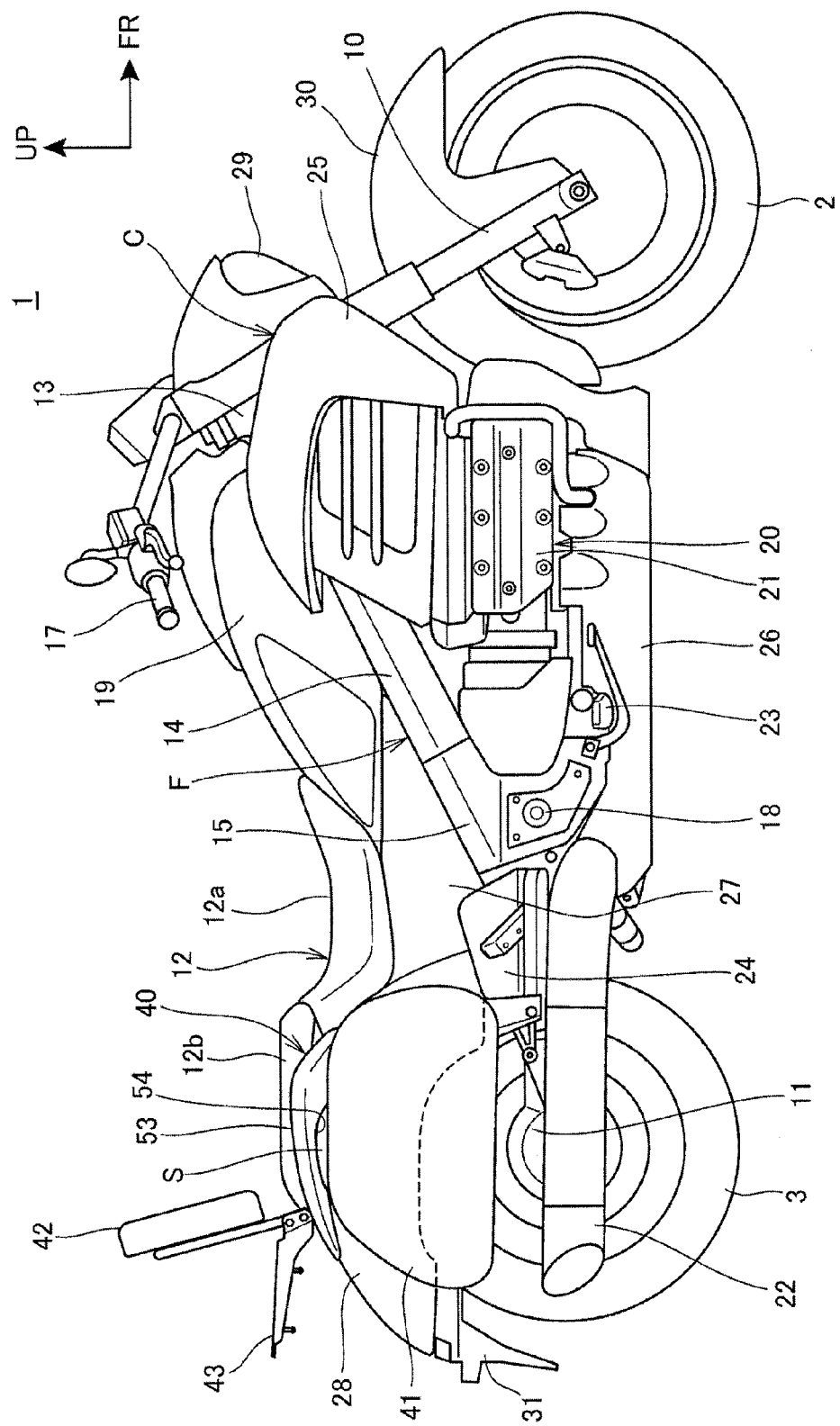
FIG. 1 is a right side view of a motorcycle according to the embodiment of the present invention.

Hereinafter, the embodiment of the present invention will be described with reference to the drawings. In the drawings, directions of front and rear, left and right, upper and lower and the like in the description below are the same as those of the vehicle body, unless it is explicitly stated otherwise. In addition, in the drawing, an arrow FR shows the front, an arrow UP shows the upper, and an arrow LE shows the left side of the vehicle body.

FIG. 1 is a right side view of a motorcycle according to an embodiment of the present invention.

A motorcycle 1 is a straddle type vehicle in which an engine 20 is supported below a body frame F, a front fork 10 supporting a front wheel 2 is steerably supported on the front end of the body frame F, a swing arm 11 supporting a rear wheel 3 is provided on the rear portion side of the body frame F, and a seat 12 on which passengers sit is provided above the body frame F. The body frame F is partially covered with a resin-made vehicle body cover C.

The body frame F includes a head pipe 13 provided on the front end thereof; a pair of left and right main frames 14 extending so as to be inclined downward to the rear direction from the head pipe 13; a pair of left and right center frames 15 that are positioned in the center of the front and rear of the vehicle and extend downwardly from the rear end of the main frames 14; and a pair of left and right seat rails 16 (FIG. 3) that extend upwardly to the rear direction from the upper portion of the center frames 15 to the rear portion of the vehicle.

The front fork 10 is rotatably and pivotally supported via a steering shaft (not shown) on the head pipe 13, and the front wheel 2 is pivotally supported on the lower portion of the front fork 10. A handle 17 for steering is fixed on the upper end of the front fork 10.

The swing arm 11 is rotatably and pivotally supported by a pivot shaft 18 that penetrates through the center frames 15 in the width direction of the vehicle, and the rear wheel 3 is pivotally supported on the rear end of the swing arm 11.

The engine 20 is a multi-cylinder horizontally opposed four-cycle engine, in which a crank shaft is disposed so as to be directed in the front-and-rear direction, and a cylinder portion 21 extends in the left-and-right direction. An exhaust pipe (not shown) of the engine 20 is drawn rearward while passing below the engine 20, and connected to mufflers 22 that are disposed in a left and right pair on the side of the swing arm 11.

A fuel tank 19 is disposed above the main frames 14, and extends from the vicinity of the head pipe 13 up to above the center frames 15.

The seat 12 is continuously provided from the rear end of the fuel tank 19, and extends up to the rear portion of the vehicle. The seat 12 includes a front seat 12a, on which a rider sits, and a rear seat 12b on which a pillion passenger sits. Steps for a rider 23 are provided further forward than the front seat 12a and below the center frames 15. Folding-type plate-like tandem steps 24 are disposed below the rear portion of the front seat 12a.

The vehicle body cover C includes a pair of left and right front side covers 25 covering the front portion of the main frames 14 and the upper portion of the engine 20 from the side; an undercover 26 covering the engine 20 from below; a pair of left and right middle covers 27 covering the lower portion of the front seat 12a; and a rear portion cover 28 (vehicle body) covering the upper portion of rear wheel 3.

A headlight 29 is provided in front of the head pipe 13. The upper portion of the front wheel 2 is covered with a front fender 30.

Grab rails 40 for holding by the pillion passenger are provided respectively on the sides of the rear seat 12b, and saddlebags 41 are provided in a left and right pair below the grab rails 40 as well as on the sides of the rear portion cover 28. In addition, a backrest 42 and a rear carrier 43 are provided in the rear portion of the vehicle.

Figure 2:
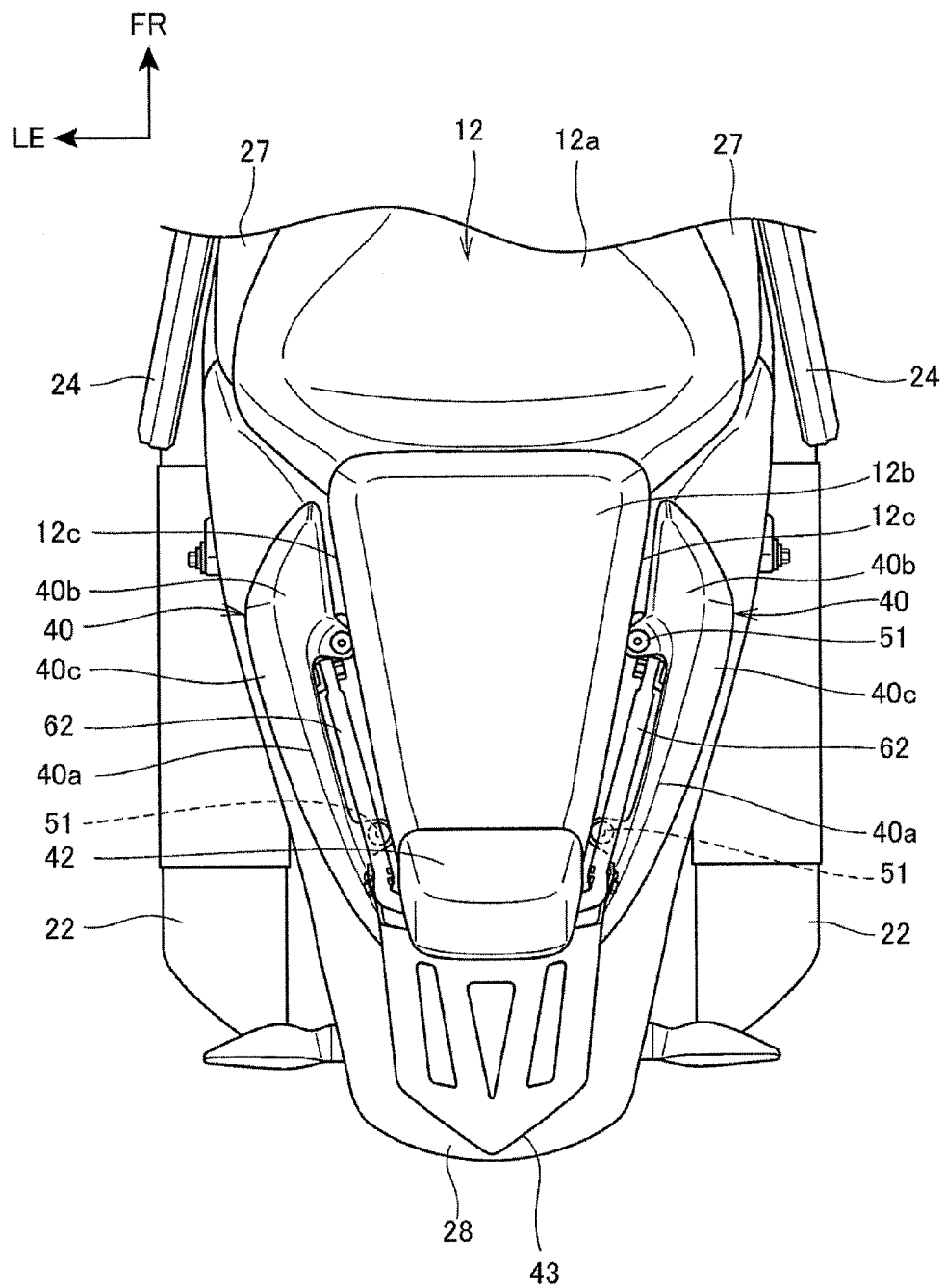
FIG. 2 is a plan view of the rear portion of the vehicle seen from the top.

FIG. 2 is a plan view of the rear portion of the vehicle seen from the top. FIG. 2 shows the state in which the saddlebags 41 are removed.

As shown in FIGS. 1 and 2, the rear portion cover 28 is a cover covering the rear wheel 3 from above. The rear portion cover 28 is formed so as to taper toward the rear side in a top view, and the interval of the left and right edge portions becomes narrower toward the rear portion side.

The rear seat 12b is disposed above the rear portion cover 28 so as to be continuously provided from the rear portion of the front seat 12a, and is formed higher by a step than the front seat 12a.

The rear seat 12b is disposed in the center of the width direction of the vehicle, and the interval of the left and right edge portions 12c, 12c are formed so as to become narrower toward the rear portion side.

The grab rails 40, 40 are provided in a left and right pair on the sides of the rear seat 12b, and extend in the front-and-rear direction from the vicinity of the front edge of the front seat 12a up to the rear of the rear edge of the front seat 12a. The grab rails 40, 40 are disposed so as to be parallel to the edge portions of the rear seat 12b, in a tapered shape in such a way that the interval of the left and right grab rails 40, 40 becomes gradually narrower as it approaches the rear side. The grab rails 40, 40 are disposed further inside in the width direction of the vehicle than the left and right edge portions of the rear portion cover 28.

The rear equipment is detachably provided in the rear of the vehicle body, such as the backrest 42 and the rear carrier 43. The rear equipment is attached via the grab rails 40, 40 to the motorcycle 1.

The backrest 42, that is used as a backrest for a pillion passenger sitting on the rear seat 12b, is disposed above the rear portion of the rear seat 12b, and is provided in a slightly inclined posture to the rear direction relative to in the vertical direction. The backrest 42 is fixed on the grab rails 40, 40.

The plate-like rear carrier 43 for loading luggage and the like extends rearward from the backrest 42 in a slightly upward posture to the rear direction. The rear carrier 43 is fixed to the backrest 42.

Figure 3:
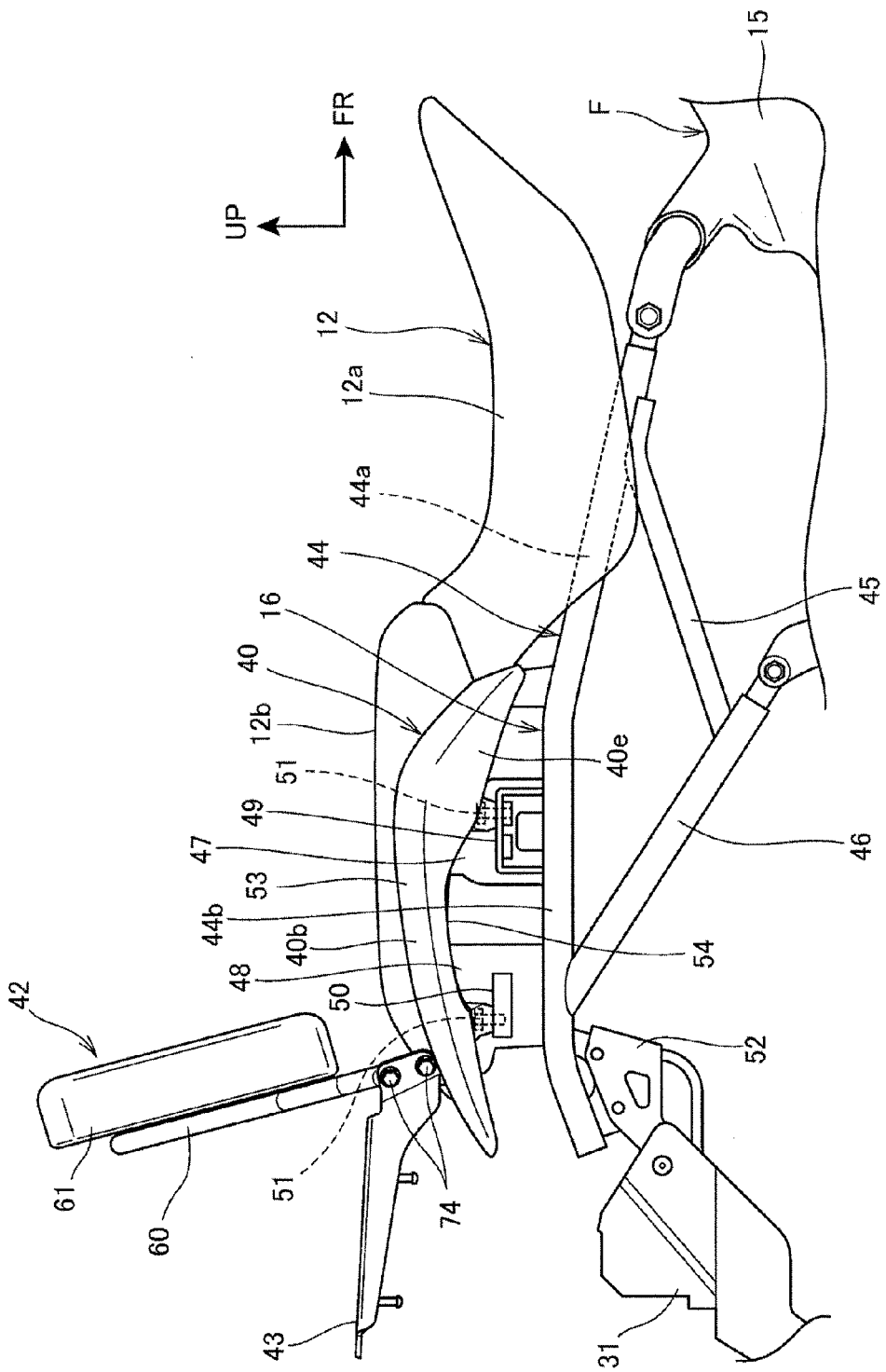
FIG. 3 is a right side view of the rear portion of the vehicle.

FIG. 3 is a right side view of the rear portion of the vehicle. In FIG. 3, the descriptions of the rear portion cover 28, the saddlebag 41, the rear wheel 3 and the like are omitted.

The body frame F includes the pair of left and right seat rails 16, extending rearwardly from the rear portion of the center frames 15, and the seat 12 is supported by the seat rails 16. Each of the seat rails 16 has a rail portion 44 that is jointed to the center frame 15 and then extends upward to the rear direction; a front side subframe 45 that extends downward to the rear direction from the front portion of the rail portion 44; and a rear side subframe 46 that extends upward to the rear direction from the rear end of the front side subframe 45 and is jointed to the rear portion of the rail portion 44.

The rail portion 44 has a front side pipe portion 44a that extends upward to the rear direction from the front end to the intermediate portion of the rail portion and a horizontal pipe portion 44b that extends substantially horizontally rearwardly from the rear end of the front side pipe portion 44a.

The horizontal pipe portion 44b of the rail portion 44 has a front side seat support portion 47 and a rear side seat support portion 48, that protrude upwardly from the upper surface of the horizontal pipe portion. The front side seat support portion 47 supports the front portion of the rear seat 12b from below. The front side seat support portion 47 is formed above the connecting portion between the rail portion 44 and the rear side subframe 46, and supports the rear portion of the rear seat 12b from below.

The front side seat support portion 47 and the rear side seat support portion 48 have grab rail mounting portions 49, 50 extending outward, respectively. The grab rails 40, 40 are fixed on the grab rail mounting portions 49, 50 by grab rail fixing bolts 51, 51 that are fastened to the grab rail mounting portions 49, 50. Although the grab rails 40, 40 are fixed via the grab rail mounting portions 49, 50 to the seat rails 16, the seat rails 16 are covered with the rear portion cover 28, so that apparently, the grab rails 40, 40 seem to be attached to the rear portion cover 28.

The rear end of the rail portion 44 bends downwardly, and a fender stay 52, to which a rear fender 31 is fixed, is provided in this position.

Figure 4:
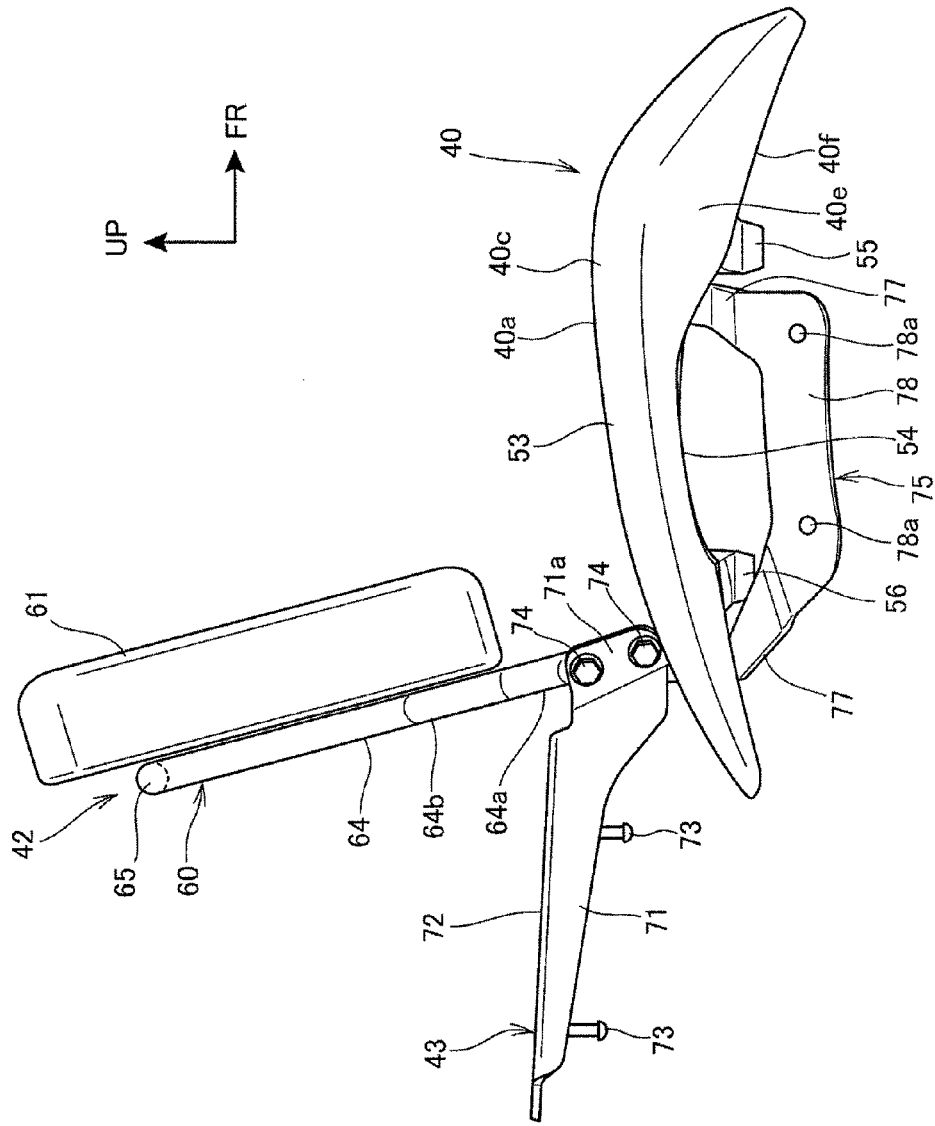
FIG. 4 is a right side view of a grab rail and a rear equipment.
Figure 5:
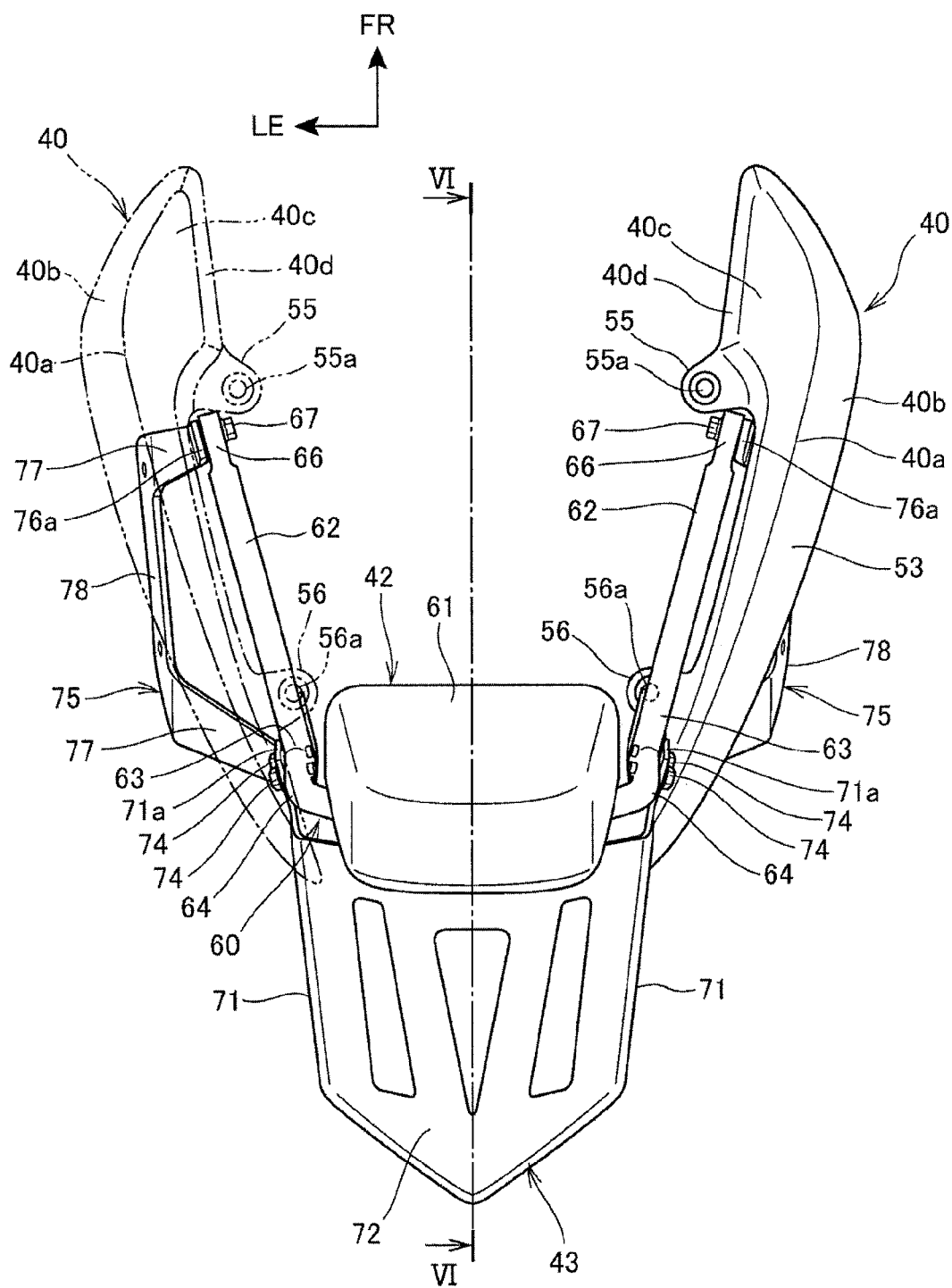
FIG. 5 is a plan view of the grab rails and the rear equipment seen from the top.
Figure 6:
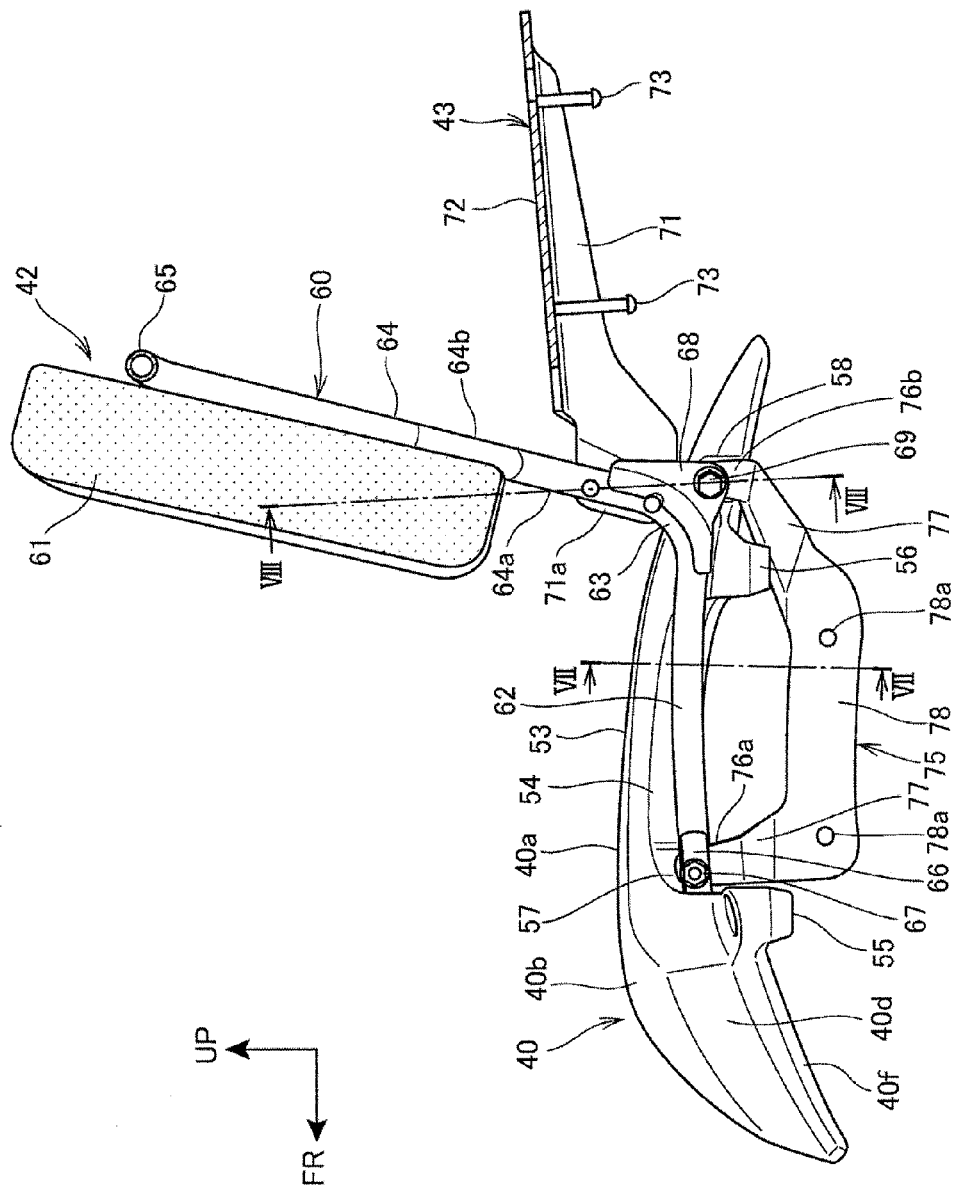
FIG. 6 is a sectional view taken along a line VI-VI of FIG. 5.
Figure 7:
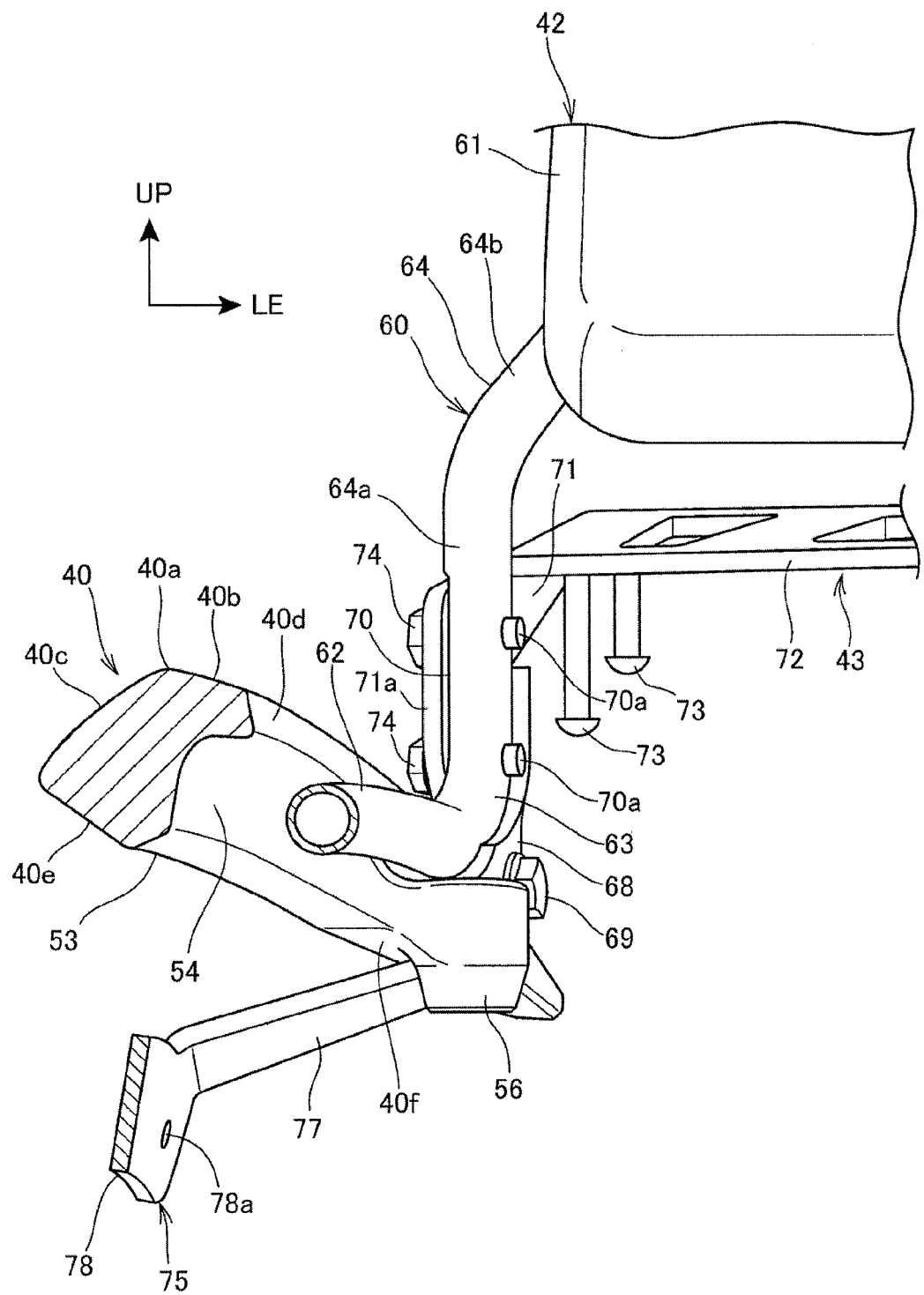
FIG. 7 is a sectional view taken along a line VII-VII of FIG. 6.

FIG. 4 is a right side view of the grab rails 40 and the rear equipment. FIG. 5 is a plan view of the grab rails 40, 40 and the rear equipment seen from the top. FIG. 6 is a sectional view taken along a line VI-VI of FIG. 5. FIG. 7 is a sectional view taken along a line VII-VII of FIG. 6.

The grab rails 40, 40, the backrest 42 and the rear carrier 43 are formed symmetrically, and therefore, those on the right side will be mainly referred to for explanation.

As shown in FIGS. 4 to 7, the grab rail 40 is a bar-shaped member that is formed so as to be wider at the front portion thereof, and to be tapered as approaching the rear portion side. For example, the grab rail is formed by casting the aluminum alloy.

The grab rails 40 curve so as to be positioned inside in the width direction of the vehicle as approaching the rear portion side thereof in a plan view (FIG. 5), and curve gradually so as to be convex upward in a side view (FIG. 4).

The grab rail 40 has a ridge line 40a, that extends over the entire length of the grab rail in the front-and-rear direction, substantially in the center in the width direction of the upper surface of the grab rail. Referring to FIG. 7, on the upper surface of the grab rail 40, an inside upper surface portion 40b is formed that is inclined inward in the width direction of the vehicle and directs downward with reference to the ridge line 40a as a border, and an outside upper surface portion 40c is formed that is inclined outward in the width direction of the vehicle and is directed downwardly. The grab rail 40 has an inside side surface portion 40d, that extends downwardly from the lower edge of the inside upper surface portion 40b, and an outside side surface portion 40e that is inclined inward in the width direction of the vehicle from the lower edge of the outside upper surface portion 40c and is directed downwardly. In addition, the grab rail 40 has a lower surface portion 40f that connects between the lower edge of the inside side surface portion 40d and the lower edge of the outside side surface portion 40e.

The grab rail 40 has a grip portion 53 for a pillion passenger sitting on the rear seat 12b to hold in the intermediate portion in the front-and-rear direction of the grab rail. The grip portion 53 has a concave portion 54 for gripping which is formed in such a way to recess the outside side surface portion 40e, the lower surface portion 40f and the inside side surface portion 40d toward the inside of the grab rail 40, at the lower portion of the grab rail. The concave portion 54 for gripping is provided over the entire length of the grip portion 53.

The grab rail 40 has a front side seating portion 55, which is fixed to the grab rail mounting portion 49 (FIG. 3) on the front side, and a rear side seating portion 56 which is fixed to the grab rail mounting portion 50 on the rear side.

The front side seating portion 55 is provided in front of the grip portion 53 on the front portion of the grab rail 40, and is formed so as to protrude inward in the width direction of the vehicle from the lower portion of the inside side surface portion 40*d*. The front side seating portion 55 is formed in a bottomed cylindrical shape extending vertically, and a hole portion 55*a*, through which a grab rail fixing bolt 51 (FIG. 3) penetrates, is formed on the bottom surface of the front side seating portion 55.

The rear side seating portion 56 is provided in the rear of grip portion 53 on the rear portion of the grab rail 40, and is formed so as to protrude inward in the width direction of the vehicle from the lower portion of the inside side surface portion 40*d*. The rear side seating portion 56 is formed in a bottomed cylindrical shape extending vertically, and a hole portion 56*a*, through which the grab rail fixing bolt 51 (FIG. 3) penetrates, is formed on the bottom surface of the rear side seating portion 56.

As shown in FIG. 3, the grab rail 40 is placed on the grab rail mounting portions 49, 50 at the rear portion of the seat rail 16, and is fastened to the grab rail mounting portions 49, 50 with the grab rail fixing bolts 51, 51 that penetrate through the hole portions 55*a*, 56*a* from above. Accordingly, the grab rail fixing bolts 51, 51 cannot be seen from the side, which thereby improves the external appearance.

The grab rail 40 curves in an upwardly convex shape, and the concave portion 54 for gripping is provided in the grab rail at the same time. Therefore, as shown in FIG. 1, a space S, into which the pillion passenger may place his/her fingers, is formed between the lower surface of the grip portion 53 and the upper surface of the rear portion cover 28. Thus, it is easy for the pillion passenger to hold the grip portion 53.

As shown in FIG. 6, a front side mounting portion 57 and a rear side mounting portion 58, to which the backrest 42 is attached, are provided on the inside side surface portion 40*d* of the grab rail 40.

The front side mounting portion 57 is disposed between the front side seating portion 55 and the concave portion 54 for gripping at the front portion of the grab rail 40. The rear side mounting portion 58 is disposed behind the concave portion 54 for gripping and the rear side seating portion 56 at the rear portion of the grab rail 40. More specifically, the front side mounting portion 57 and the rear side mounting portion 58 are provided in the front and in the rear of the grip portion 53, respectively.

The backrest 42 comprises a frame member 60, that is supported on the grab rails 40, and a backrest portion 61 that is fixed on the upper portion of the frame member 60.

The frame member 60 is formed by bending a piece of pipe, whose sectional surface is substantially circular. The frame member 60 comprises a pair of left and right front-and-rear extension portions 62, 62 that extend in the front-and-rear direction respectively along the inside side surface portion 40*d* of each of the grab rails 40, 40; bending portions 63, 63 that bend upwardly from the rear end of the front-and-rear extension portions 62, 62; a pair of left and right upper-and-lower extension portions 64, 64 that extend upwardly from the bending portions 63, 63; and left-and-right connecting portion 65 that laterally connects the upper ends of the upper-and-lower extension portion 64, 64.

At the front end of the front-and-rear extension portion 62, there is a front fixing portion 66 for being fixed to the front side mounting portion 57 of the grab rail 40. The front fixing portion 66 is formed by flattening the front end of the front-and-rear extension portion 62. The front fixing portion 66 is fastened to the front side mounting portion 57 with an equipment fixing bolt 67 which penetrates the hole portion of the front fixing portion 66 from inside in the width direction of the vehicle.

A rear fixing portion 68, that is fixed on the rear side mounting portion 58 of the grab rail 40, is provided so as to protrude rearwardly on the rear surface of the bending portion 63. The rear fixing portion 68 is formed in a vertically extending plate shape, and is fixed by welding. The rear fixing portion 68 is positioned in the rear of the rear side seating portion 56. The rear fixing portion 68 is fastened to the rear side mounting portion 58 with an equipment fixing bolt 69 that penetrates the hole portion of the rear fixing portion 68 from inside in the width direction of the vehicle.

Figure 8:
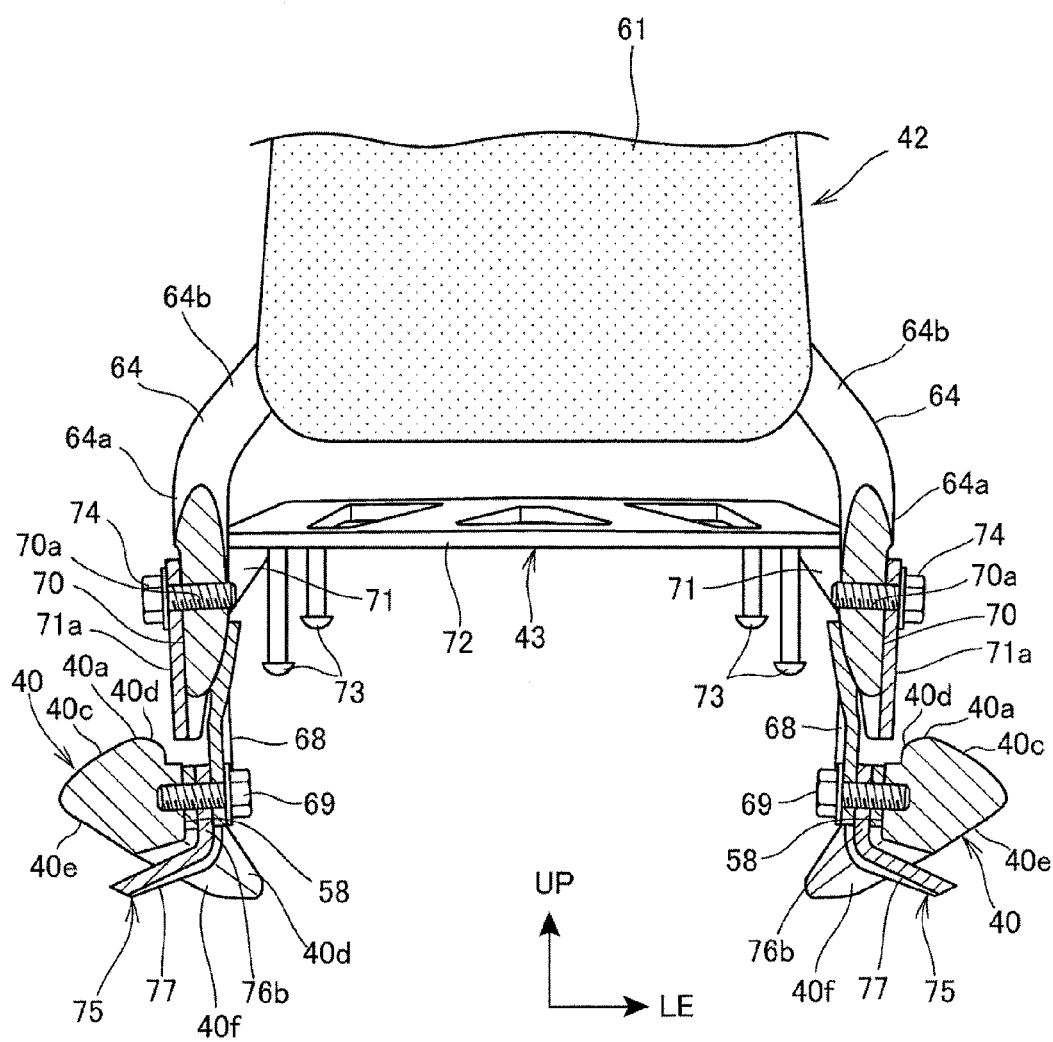
FIG. 8 is a sectional view taken along a line VIII-VIII of FIG. 6.

FIG. 8 is a sectional view taken along a line VIII-VIII of FIG. 6.

The upper-and-lower extension portions 64, 64 of the backrest 42 extend upward in a slightly inclined posture to the rear direction relative to in the vertical direction. The upper-and-lower extension portions 64, 64 have parallel portions 64*a*, 64*a* in which the left and right upper-and-lower extension portions 64, 64 extend upwardly from the bending portions 63, 63 substantially in parallel; and upward extending portions 64*b*, 64*b* that extend such that the interval of the left and right upper-and-lower extension portions 64, 64 becomes gradually narrower as it approaches the upper side.

Seating surfaces 70 are formed on the parallel portions 64*a* in such a way as to flatten the outside surface of each of the parallel portions 64*a*. Fixing hole portions 70*a*, 70*a*, that penetrate the parallel portions 64*a* in the width direction of the vehicle, are provided vertically in a pair in the seating surfaces 70. Carrier fixing bolts 74, 74 for fixing the rear carrier 43 are screwed with the fixing hole portions 70*a*, 70*a*. In addition, the seating surfaces 70 may be formed in a flat surface shape by cutting or welding.

The backrest portion 61 is a cushion material formed substantially in a rectangular shape. The backrest portion 61 is provided across the upward extending portions 64*b*, 64*b* and the front surface of the left-and-right connecting portion 65.

The rear carrier 43 includes a pair of supporting plate portions 71, 71 that extend rearward from the left and right seating surfaces 70, 70 of the backrest 42; and a loading surface portion 72 that spans between the upper edges of the supporting plate portions 71, 71. Luggage items and the like are placed on the loading surface portion 72. A plurality of hook portions 73, that protrude downwardly, are provided on the lower surface of left and right edge portions of the loading surface portion 72, and a net and the like for holding luggage items is hooked on the hook portions 73.

Plate-like bracket portions 71*a*, 71*a*, that abut on seating surfaces 70, 70, are formed at the front end of the supporting plate portions 71, 71. The rear carrier 43 is fixed to the seating surfaces 70, 70 with the carrier fixing bolts 74, 74 that penetrate the plate-like bracket portions 71*a*, 71*a* from outside in the width direction of the vehicle.

As shown in FIGS. 5, 6 and 8, plate-like saddlebag stays 75, to which the saddlebags 41 (FIG. 1) are attached, are provided on the grab rails 40.

The saddlebag stays 75 have stay portions 76*a*, 76*b* that are respectively fixed to the front side mounting portion 57 and the rear side mounting portion 58; side extending portions 77 that bend outside in the width direction of the vehicle from the lower end of stay portions 76*a*, 76*b* and then extend obliquely downwardly. The bag mounting portions 78 extend substantially straight and downwardly from the lower edge of the side extending portions 77. Hole portions 78*a*, 78*a* for mounting the saddlebag 41 are provided in a pair in the front and the rear of the bag mounting portion 78. In a top view (FIG. 5), the bag mounting portions 78 mostly overlap the grab rails 40, and are positioned below the grab rails 40.

Each of the saddlebag stays 75 is fixed to the grab rail 40 such that the stay portion 76a on the front side is sandwiched between the front side mounting portion 57 and the front fixing portion 66 of the frame member 60 and is fastened together with the equipment fixing bolt 67, stay portion 76b on the rear side is sandwiched between the rear side mounting portion 58 and the rear fixing portion 68 of the frame member 60 and is fastened together with the equipment fixing bolt 69. Accordingly, the saddlebag stays 75 can be provided with a simple configuration.

As shown in FIG. 6, the backrest 42 is attached to the front and the rear of a grip portion 53 with a pair of equipment fixing bolts 67, 69, that are provided in the front-and-rear extension portion 62 of the frame member 60, across the concave portion 54 for gripping. With such attachment, the front-and-rear extension portion 62 extend in the front-and-rear direction inside in the width direction of the vehicle of the backrest 42 so as to be parallel to the concave portion 54 for gripping and to be further inside relative to the concave portion 54 for gripping. In addition, the upper-and-lower extension portions 64, 64 of the frame member 60 extend upwardly from the inside in the width direction of the vehicle of the rear portion of the grab rails 40.

More specifically, the front-and-rear extension portion 62, which functions as the attachment portion for the backrest 42 to the grab rail 40, is disposed further inside relative to the grab rail 40 so as to overlap the grab rail 40 including the grip portion 53 in a side view shown in FIGS. 4 and 6. With such configuration, front-and-rear extension portion 62 which is hidden behind the grab rail 40 in a side view cannot be seen from outside, that can improve the external appearance. In addition, the equipment fixing bolts 67, 69 are fastened to the front side mounting portion 57 and the rear side mounting portion 58 inside the grab rail 40 and the equipment fixing bolts 67, 69 do not penetrate through to the outside at the same time. Accordingly, they cannot be seen from outside, which improves the external appearance.

Referring to FIGS. 1 and 7, the pillion passenger sitting on the rear seat 12b holds the grip portion 53 of the grab rail 40 from above and from outside. For example, the pillion passenger puts his/her palm on the upper surface of the grip portion 53, puts his/her four fingers except his/her thumb into the space S (FIG. 1) from the outside, holds the grip portion 53 by putting the fingers on the concave portion 54 for gripping and putting the thumb on the inside side surface portion 40d. More specifically, the front-and-rear extension portion 62 is disposed inside the grab rail 40 so as not to be obstructive for the passenger to hold. In the embodiment of the present invention, the space S is provided and the front-and-rear extension portion 62 is located in the inside position spaced apart from the grip portion 53 so as not to be obstructive for the passenger to hold. Accordingly, it is easy for the pillion passenger to hold the grip portion 53. To the contrary, for example, in such a configuration that the pipe is provided below the grab rail 40, the pipe closes up the space S, which makes it difficult for the pillion passenger to hold the grip portion.

In addition, the front-and-rear extension portions 62, 62 are positioned further outside relative to the edge portions 12c, 12c (FIG. 2) of the rear seat 12b, so that they are not obstructive for the pillion passenger sitting on the rear seat 12b.

Moreover, since each of the front-and-rear extension portions 62 is fixed to the front side mounting portion 57 and the rear side mounting portion 58 that are disposed so as to substantially spaced apart across the front and the rear of the grip portion 53, the front-and-rear extension portions can receive the heavy load applied on the backrest portion 61.

Further, the backrest 42 is attached to the rear portion of the grab rails 40, 40 in which the interval of the left and right grab rails 40, 40 is narrower, which thereby can improve the rigidity of the backrest 42.

As described above, according to the embodiment of the present invention, the grab rails 40, 40, that are attached to the seat rails 16 on the sides of the rear seat 12b, have the grip portions 53, 53 extending in the front-and-rear direction of the vehicle body. The backrest 42, that is included in the rear equipment, is disposed inside the grip portions 53, 53 and is supported by the grab rails 40, 40 in the front and the rear of grip portions 53, 53, and overlaps the grab rails 40, 40 in a side view. With such a construction, the interval of the front side mounting portion 57 and the rear side mounting portion 58 is lengthened by fixing the backrest 42 on the front and rear of the grab rails 40, 40, which can support the backrest 42 effectively. Further, since the backrest 42 is unobstructively located inside the grip portions 53, 53, the space S can be secured between the grip portion 53, 53 and the rear portion cover 28. Accordingly, it is easy for the pillion passenger to hold the grab rails 40, 40.

In addition, the grab rails 40, 40 are fastened vertically relative to the vehicle body in the front and rear of the grip portions 53, 53, and the backrest 42 is fastened to the front side mounting portion 57 and the rear side mounting portion 58, that are formed inside the grab rails 40, 40, with the equipment fixing bolts 67, 69 that are screwed in the left-and-right direction of the vehicle body. Accordingly, in a side view, the grab rail fixing bolts 51, 51, the front side mounting portion 57, the rear side mounting portion 58 and the equipment fixing bolts 67, 69 are difficult to be seen from the outside. Thus, the external appearance is improved. In addition, the grab rails 40, 40 may be fastened in the left-and-right direction relative to the vehicle body.

In addition, the rear equipment is the backrest 42 that is formed by bending a piece of pipe. Compared to the case in which the backrest 42 is made up of plate-like members and the like, the backrest 42 can be vertically narrower, so that the front-and-rear extension portions 62 of the backrest 42 can be disposed so as to be accommodated within the vertical width of the grab rails 40, 40. Thus, the external appearance is improved. In addition, the grab rails 40, 40 are disposed in a tapered shape such that the interval of the left and right grab rails 40, 40 becomes gradually narrower as it approaches the rear side, and the interval of the left and right pipes constituting the backrest 42 becomes also narrower, which can improve the rigidity of the backrest 42. In addition, the grab rails 40, 40 may be disposed in parallel so that the interval of the left and right grab rails 40, 40 may be constant.

Further, the backrest 42 has the seating surfaces 70, 70 that are formed by flattening the pipe, and the plate-like bracket portions 71a, 71a of the rear carrier 43 is fastened to the seating surfaces 70, 70. Accordingly, the rear carrier 43 can be fastened in a simple configuration.

Furthermore, the saddlebag stays 75 are fastened together with the front side mounting portion 57 and the rear side mounting portion 58. Accordingly, the saddlebag stays 75 can be provided in a simple configuration.

In addition, the backrest 42 has the front-and-rear extension portions 62, 62 that extend in the front-and-rear direction so as to be parallel to the grab rails 40, 40. The front-and-rear extension portions 62, 62 are fixed on the grab rails 40, 40 so as to connect the front and rear of the grip portions 53, 53, and as well as overlap the grip portions 53, 53 in a side view. Accordingly, the backrest 42 can be supported via the front-and-rear extension portions 62, 62 on the grab rails 40, 40 effectively. Further, it is possible to improve the rigidity of the grab rails 40, 40 as well as to improve the external appearance by hiding the entire front-and-rear extension portions 62, 62 inside the grab rails 40, 40.

Further, the above-mentioned embodiment shows a mode applying the present invention, and the present invention is not limited to the above-mentioned embodiment.

In the above-mentioned embodiment of the present invention, the backrest 42 and the rear carrier 43 are described as the rear equipment to be attached via the grab rails 40, but the present invention is not limited to apply to the embodiment. For example, by providing a bracket for fixing the rear carrier which comprises the front-and-rear extension portions 62, 62, the bending portions 63, 63 and the parallel portions 64a, 64a, the rear carrier 43 including the bracket for fixing the rear carrier may be attached as a rear equipment, in place for the backrest 42.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims

What is claimed is:

1. A rear structure for a straddle vehicle comprising:
a front seat adapted to position a rider;
seat rails for supporting a rear seat adapted to position a pillion passenger;
grab rails attached on a vehicle body on sides of said rear seat;
a backrest detachably attached to a rear portion of the vehicle; and
a space adapted for the pillion passenger to hold the grab rail, said space being formed between said grab rail and said vehicle body;
wherein said grab rail is configured such that a grip portion extends in a front-and-rear direction of the vehicle body; and
said backrest is disposed inside said grip portion, is supported at a front and rear of said grip portion by said grab rail and overlaps said grip portion in a side view;
said backrest is mounted to mounting portions formed on inside surfaces of said grab rails.

2. The rear structure for the straddle vehicle, according to claim 1, wherein said grab rails are fastened vertically relative to said vehicle body in the front and rear of said grip portions, and said backrest is fastened to mounting portions, formed inside said grab rails, with bolts screwed in a left-and-right direction of the vehicle body.

3. The rear structure for the straddle vehicle, according to claim 1, wherein said grab rails are provided in a left and right pair, and are disposed in a tapered shape wherein the interval of said left and right grab rails becomes gradually narrower as it approaches a rear side of the vehicle.

4. The rear structure for the straddle vehicle, according to claim 2, wherein said grab rails are provided in a left and right pair, and are disposed in a tapered shape wherein the interval of said left and right grab rails becomes gradually narrower as it approaches a rear side of the vehicle.

5. The rear structure for the straddle vehicle, according to claim 3, wherein said backrest has seating surfaces formed by flattening said pipe, and plate-like brackets of a rear carrier are fastened to the seating surfaces.

6. The rear structure for the straddle vehicle, according to claim 2, wherein saddlebag stays are fastened together with said equipment mounting portions.

7. The rear structure for the straddle vehicle, according to claim 1, wherein said backrest has front-and-rear extension portions extending in the front-and-rear direction along said grab rails, and each of the front-and-rear extension portions is fixed on said grab rail so as to connect the front and rear of said grip portion as well as to overlap said grip portions in a side view.

8. The rear structure for the straddle vehicle, according to claim 2, wherein said backrest has front-and-rear extension portions extending in the front-and-rear direction along said grab rails, and each of the front-and-rear extension portions is fixed on said grab rail so as to connect the front and rear of said grip portion as well as to overlap said grip portions in a side view.

9. The rear structure for the straddle vehicle, according to claim 3, wherein said backrest has front-and-rear extension portions extending in the front-and-rear direction along said grab rails, and each of the front-and-rear extension portions is fixed on said grab rail so as to connect the front and rear of said grip portion as well as to overlap said grip portions in a side view.

10. The rear structure for the straddle vehicle, according to claim 5, wherein said backrest has front-and-rear extension portions extending in the front-and-rear direction along said grab rails, and each of the front-and-rear extension portions is fixed on said grab rail so as to connect the front and rear of said grip portion as well as to overlap said grip portions in a side view.

11. A backrest detachably attached to the straddle vehicle including:
seat rails for supporting a rear seat adapted to position a pillion passenger;
grab rails attached on the vehicle body on sides of said rear seat; and
a space for the pillion passenger to hold the grab rail, said space being formed between said grab rail and said vehicle body;
the backrest wherein:
said grab rail is configured such that the grip portion extends in a front-and-rear direction of the vehicle body; and
said backrest is disposed inside said grip portion, is supported at a front and rear of said grip portion by said grab rail and overlaps the grip portion in a side view.

12. In a rear structure for a straddle vehicle comprising:
a vehicle body;
seat rails secured to said vehicle body for supporting a rear seat;
grab rails attached on the vehicle body on the sides of said rear seat;
a backrest detachably attached to a rear portion of the vehicle; and
a space for an individual to hold the grab rail, said space being formed between said grab rail and said vehicle body;
wherein said grab rail is configured such that a grip portion extends in a front-and-rear direction of the vehicle body; and
said backrest is disposed inside said grip portion, is supported at a front and rear of said grip portion by said grab rail and overlaps said grip portion in a side view;
said backrest is mounted to mounting portions formed on inside surfaces of said grab rails.

13. The rear structure for the straddle vehicle, according to claim 12, wherein said grab rails are fastened vertically relative to said vehicle body in the front and rear of said grip portions, and said backrest is fastened to equipment mounting portions, formed inside said grab rails, with bolts screwed in a left-and-right direction of the vehicle body.

14. The rear structure for the straddle vehicle, according to claim 12, wherein said grab rails are provided in a left and right pair, and are disposed in a tapered shape wherein the interval of said left and right grab rails becomes gradually narrower as it approaches a rear side of the vehicle.

15. The rear structure for the straddle vehicle, according to claim 13, wherein said grab rails are provided in a left and right pair, and are disposed in a tapered shape wherein the interval of said left and right grab rails becomes gradually narrower as it approaches a rear side of the vehicle.

16. The rear structure for the straddle vehicle, according to claim 14, wherein said backrest has seating surfaces formed by flattening said pipe, and plate-like brackets of a rear carrier are fastened to the seating surfaces.

17. The rear structure for the straddle vehicle, according to claim 13, wherein saddlebag stays are fastened together with said mounting portions.

18. The rear structure for the straddle vehicle, according to claim 12, wherein said backrest has front-and-rear extension portions extending in the front-and-rear direction along said grab rails, and each of the front-and-rear extension portions is fixed on said grab rail so as to connect the front and rear of said grip portion as well as to overlap said grip portions in a side view.

19. The rear structure for the straddle vehicle, according to claim 13, wherein said backrest has front-and-rear extension portions extending in the front-and-rear direction along said grab rails, and each of the front-and-rear extension portions is fixed on said grab rail so as to connect the front and rear of said grip portion as well as to overlap said grip portions in a side view.

20. The rear structure for the straddle vehicle, according to claim 14, wherein said backrest has front-and-rear extension portions extending in the front-and-rear direction along said grab rails, and each of the front-and-rear extension portions is fixed on said grab rail so as to connect the front and rear of said grip portion as well as to overlap said grip portions in a side view.

\* \* \* \* \*